Figure 1:
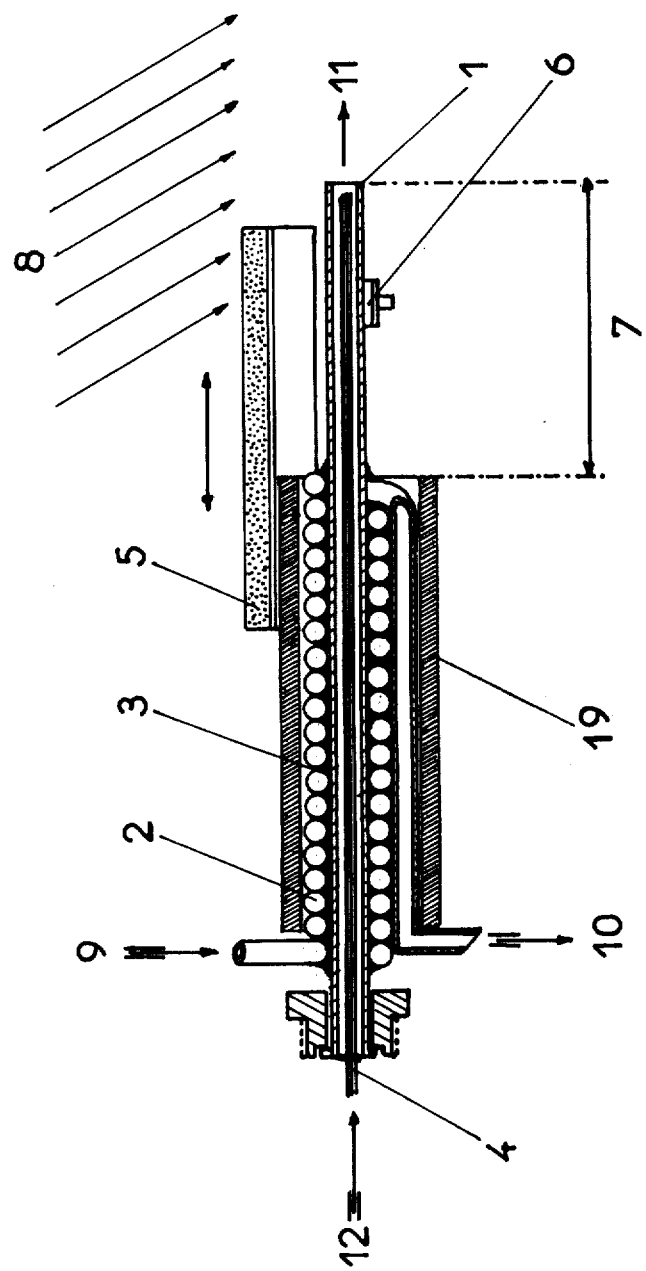

United States Patent [19]

Fillon

[11] 4,373,657

[45] Feb. 15, 1983

[54] DEVICES AND METHOD FOR DELIVERY OF SOLDER AND BRAZING MATERIAL

[76] Inventor: Marc Fillon, 120 Grande Rue, 89720 Villeblevin, France

[21] Appl. No.: 163,429

[22] Filed: Jun. 27, 1980

[51] Int. Cl.³ .......................... B23K 9/12; B23K 3/06
[52] U.S. Cl. ........................................ 228/229; 228/8; 228/11; 228/41; 228/244; 219/137.2
[58] Field of Search ............... 228/9, 10, 11, 41, 53, 228/8, 244, 232, 229; 219/137.42, 137.62, 137.2

[56] References Cited

U.S. PATENT DOCUMENTS

| | | | |
|---|---|---|---|
| 2,089,014 | 8/1937 | Bucknam et al. | 228/10 |
| 2,089,029 | 8/1937 | Jones | 228/11 |
| 2,777,928 | 1/1957 | Bernard | 219/137.62 |
| 3,852,565 | 12/1974 | Kager | 228/53 |
| 4,039,802 | 8/1977 | Kotani | 228/229 X |

*Primary Examiner*—Kenneth J. Ramsey
*Attorney, Agent, or Firm*—Larson and Taylor

[57] ABSTRACT

A soldering device having a guide body for receiving and delivering a filler metal to form a weldment. The guide body has an end portion which is positioned in the path of the heat from the burner to preheat the filler metal therein. The temperature of the filler metal in the end portion is sensed by a thermocouple and delivered to a memory unit for comparison with a preset temperature for operating a device for feeding the filler metal to the end portion. A cooling area upstream from the end portion having collant circulating therethrough is also controlled from the memory unit. A screen movable between the burner and the end portion to control the flow of heat to the latter is also controlled by the memory unit. The temperature of the burner flame and of the workpiece can also be sensed to assure proper working conditions upon delivery of the filler metal. Additionally, the burner and the feed of a reducing gas can be automatically terminated while changing workpieces.

16 Claims, 3 Drawing Figures

FIG_2

DEVICES AND METHOD FOR DELIVERY OF SOLDER AND BRAZING MATERIAL

The present invention relates to improvements in devices for delivery of solder and brazing material.

The technical field of the invention is that of automatic or semi-automatic machines for soldering and brazing, more particularly the thermal treatment of solders or brazing materials made as wires or ribbons, during the preliminary phase immediately prior to the soldering.

Machines are already known in which the solder or brazing material is kept at the lowest possible temperature during its passage and presence in the guide, by different means of circulation of refrigerant fluids, which has the objective of avoiding the premature melting of the said solders or brazing materials and their solidifying about the outlet orifice of the solder guide, said outlet being in a zone of more or less high temperature.

These machines, although they allow an improvement in the work done as compared to old methods, present certain drawbacks. Presently used refrigerating means do now allow fast enough delivery of the solder or brazing material, the speed being a measure of the success of work of this type.

The present invention, which is an improvement over known processes, is intended to alleviate these drawbacks on the one hand, and to allow saving of materials with a high content of precious metals.

The goal to be attained is an advance of the solder or brazing material which will allow a temperature just above the melting point to be reached at a location along the length of the solder which is necessary for execution of the soldering operation, without exceeding the said temperature during the waiting time required for automatic or non-automatic changes of position of the pieces to be soldered or brazed.

This objective is attained by a device for preheating the filler metal (solder) which allows use of said materials with a very low content of precious metals. Because of the possible use of filler metals with a high melting point and neutral reducer gases, the saving is very great in all soldering processes, MIG (metal inert gas), MAG (metal argon gas), or TIG (tungsten inert gas). In fact, since the temperature of the filler metals is kept near their melting point, only a slight application of heat suffices at the actual moment in which the filler metal touches the pieces to be soldered together, which pieces in turn are at the melting temperature of the said filler metal, the soldering is perfect although no borax is utilized. Moreover, it is possible to use solders or brazing materials with a very low content of precious metals in consideration of their high melting point, between six hundred and fifteen hundred degrees centigrade or more. The saving in filler metals is thus very great. The device that is the subject of the present invention is adapted readily to solders or brazing materials with use of an oxy-acetylene burner, and it may also be adapted to equipment of electric work stations with high induction or medium frequency.

The attached drawings illustrate by way of example a form of embodiment of the device according to the invention.

FIG. 1 shows schematically and in section the device for preheating the filler metal, with its refrigerant fluid circulation and its thermal regulation screen.

Figure 2:
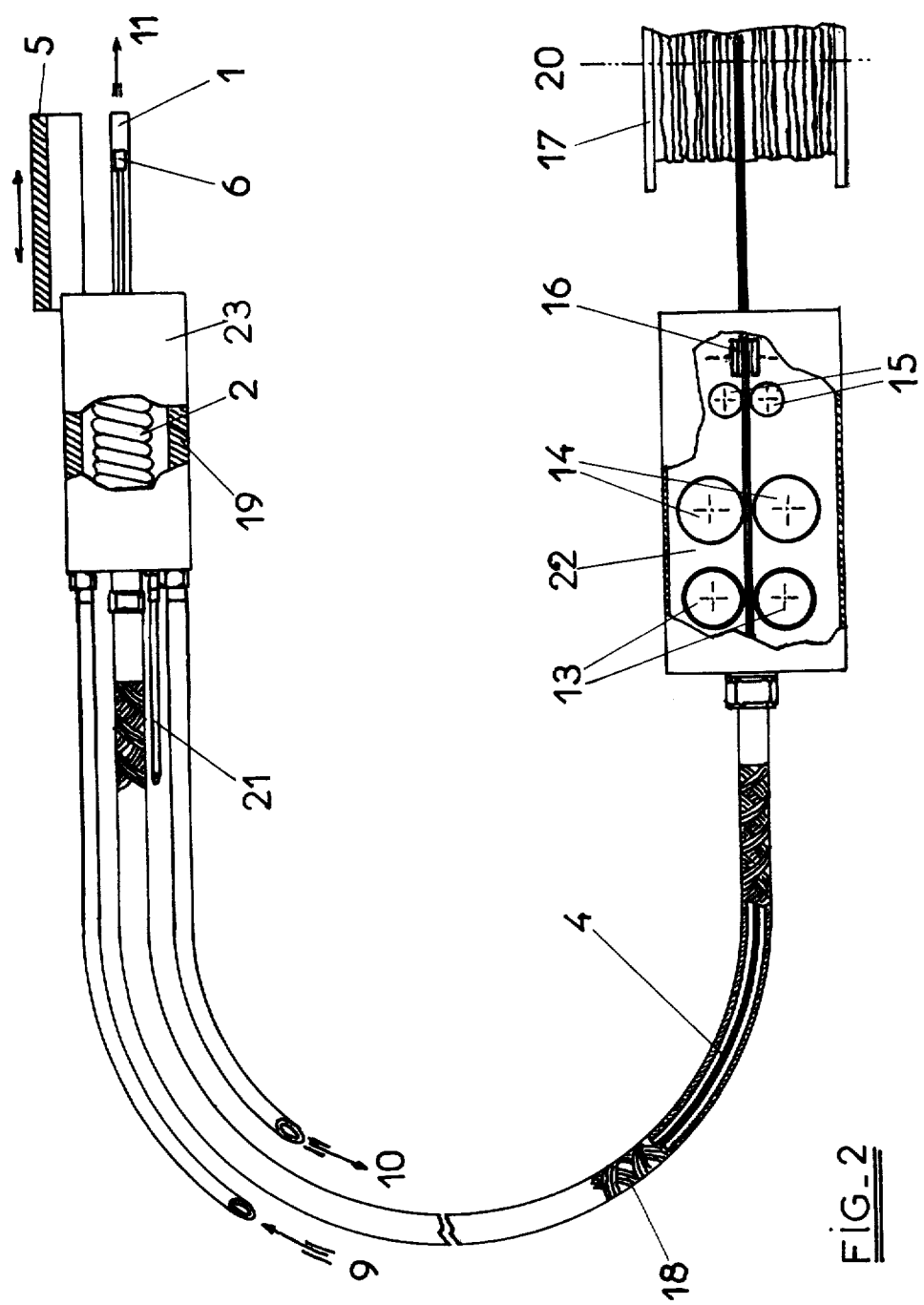

FIG. 2 schematically shows the mobile soldering head assembly and advance of the solder wire or ribbon according to the invention.

Figure 3:
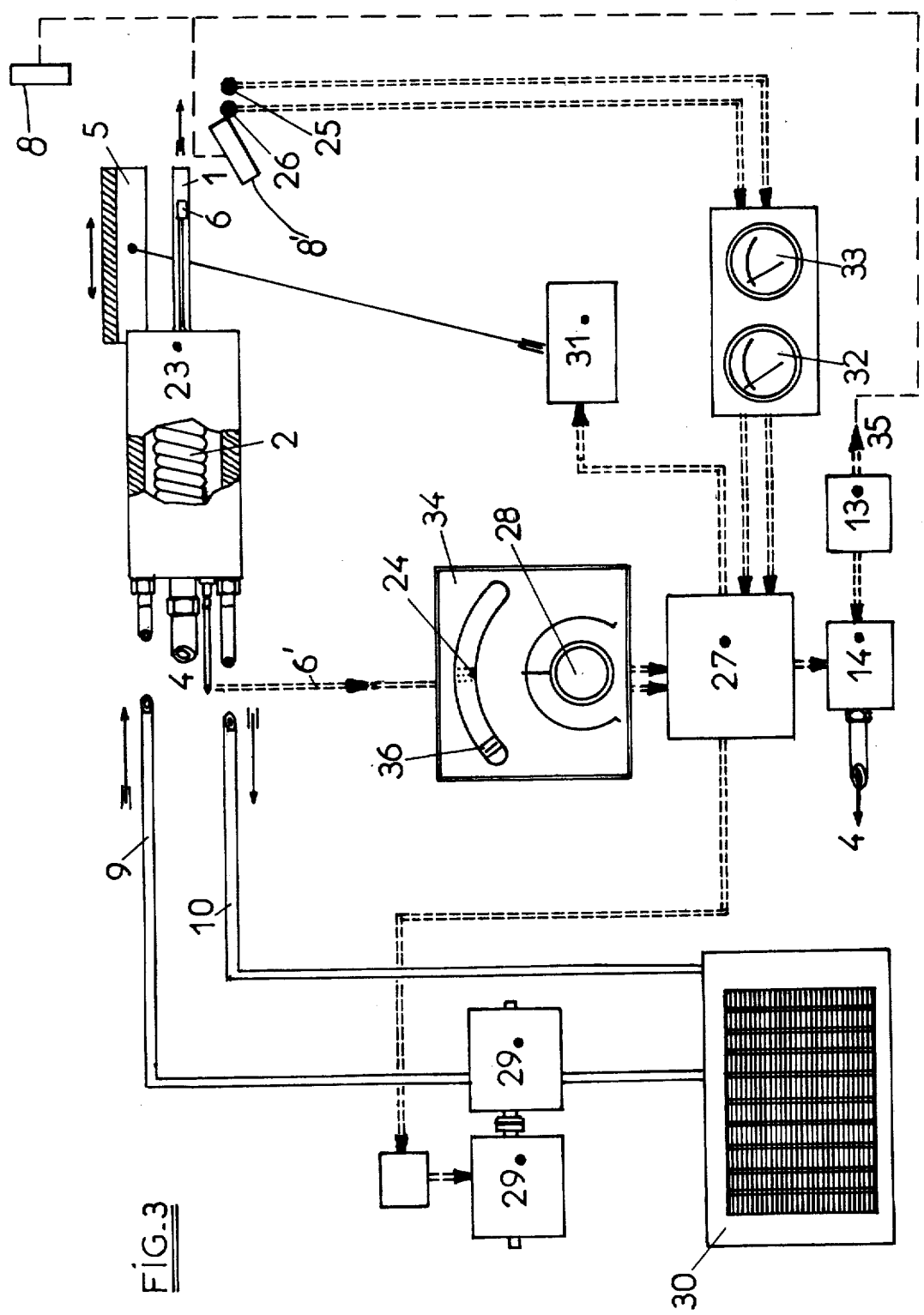

FIG. 3 shows schematically known devices associated with the principal subject of the present patent of invention.

As shown schematically and in section in FIG. 1, the device comprises a tubular hollow body 1 which is the solder guide for wires or ribbons 4, whereof the intake is at 12 and the outlet at 11. Tubular body 1 is surrounded by a second hollow body 2 which is likewise tubular. The two hollow bodies 1 and 2 are intimately joined by pouring of brazing material 3, which results in a good heat exchange therebetween. Tubular hollow body 2 has a refrigerant fluid passing through it, entering at 9 and issuing at 10. The nature of this refrigerant fluid is to be selected according to the temperature range required for execution of the work in progress.

The assembly of hollow bodies 1 and 2 is surrounded by a third hollow body 19 which is intended to hold and guide the assembly. It is to be noted that a part 7 of hollow body 1 is not cooled by the refrigerant fluid that flows through helical coil 2, and that it is precisely in the said zone 7 that the filler metal is to be brought to the optimum temperature from which its advance will be triggered to effect the soldering. This advance cannot occur unless thermocouple 6 senses that the intended temperature has been reached. In general, it is thermocouple 6 that will not only trigger the movement of filler metal 4 but will also regulate the said temperature by causing a variation of the fluid flow in 2 and laterally moving protective screen 5 in the required direction, either allowing heat from burner 8 to reach zone 7 or interposing the said thermal screen 5 between the flux due to burner 8 and zone 7 to limit the heat applied to the filler metal, in zone 7. Thermocouple 6 is thus shown to be an important device, because it determines the overall functioning of the assembly by action on the variable protection of zone 7 against the thermal flux from a burner on the one hand and the velocity of the passage of filler metal 4 on the other hand.

The originality of the invention resides in the regulation of the thermal exchanges and their equilibrium attained according to predetermined criteria, between the temperature of the part of the filler metal contained in zone 7 of the solder or brazing material guide and the temperature of the work pieces to be soldered or brazed.

FIG. 2 shows schematically the assembly comprising the mobile head of FIG. 1, wire or ribbon filler metal advance means, refrigeration circuits and a thermoelectric couple. There are shown tubular body 1 which guides and/or heats filler metal 4, the outlet of the said body being at 11, and also the position of thermoelectric couple 6, refrigeration tube 2 within which the refrigerant fluid circulates, whereof the intake is at 9 and the outlet at 10, as well as support 19 for soldering head 23. Also shown is flexible sheath 18 which ensures translation of the wire or ribbon filler metal 4 between propulsion device 14 and mobile soldering head 23, no matter what the position of the latter may be. A detective device 13, which may be mechanical or electrical, detects not only the advance of filler metal 4 but also its presence. Its role is to stop the soldering process as soon as the filler metal reserve spool is empty, the said reserve spool being shown at 17, turning on its shaft 20. In addition, detector 13, which detects the presence of filler metal allows the counting of the soldered pieces.

Wire guides are provided at 15 and 16. The slave mobile fire screen is shown at 5. An advantage of this arrangement resides in the flexible connection 18 between filler metal propulsion device 14 which is stationary and the mobile soldering head 23. All useful positions in work in progress can be adapted without great material displacement. All connections between mobile soldering head 23 and the various feeds that serve it can be put into any useful position. These movements are very rapid and save much time in the initial regulations of the various parts of the device.

Thus far it is seen that a principal feature of the present invention resides in the fact that at the output of wire guide 1 a filler metal is obtained which is close to its melting point, allowing a great simplification of the tooling for holding the workpieces to be soldered at the actual moment of the advance of the said filler metal.

FIG. 3 shows schematically by way of illustration what is in practice an efficient automatic facility for soldering or brazing, which intergrates the preheating device for the filler metal. There is shown the mobile distributor head 23 for filler metal with its solder guide tube 1, thermocouple 6 associated therewith, as well as slave mobile thermal screen 5 and the intake and output of refrigerant fluid, 9 and 10 respectively. The functioning of the whole is as follows. With the pieces to be soldered or brazed in place and the burner or burners ignited (not shown), the flame temperature of the said burner is sensed by thermocouple 26 and posted on measurement apparatus 32. The temperature of the work piece to be soldered is sensed by a pyrometric apparatus 25 and posted on apparatus 33, the two temperatures then being transmitted to the memories of a programmed electronic integrator 27 which will give the commands at the correct moment. During the heating of the work piece to be soldered, thermal screen 5 being inoperative (retracted out of the path of the heat), guide 1 for solder or filler metal will be heated up to near the flame of the burner, and thermocouple 6 will send the value of its measurement via 6' to 36 which is the index of the apparatus 34 for direct measurement of temperature, on which the temperature of the filler metal has been manually posted ahead of time, determined according to the soldering temperature of the pieces to be treated, by means of command 28 which determines the position of reference index 24. As soon a mobile index 36 of measuring apparatus 34 coincides with reference index 24, a signal will be transmitted to electronic integrator 27, and the soldering can take place on condition that the indications at 33 of the temperature of the workpiece is propitious for this operation. If one of the criteria is not met there will be no soldering operation. On the contrary, if the measurements are in agreement, element 27 will integrate them and it can trigger the command for advance of the solder or filler metal 4 by mechanism 14.

As soon as the automatic soldering machine is put into operation, variable flow motor pump 29 is started and the refrigerant fluid circulates between radiator 30 and heat evacuator coil 2 of soldering head 23, via lines 9 and 10. Temperature indicator 36 of thermocouple 6 will move toward manually posted temperature at index 24 as noted above, and when there is coincidence between the temperatures at 36 and 24 which is the temperature of 6 that is precisely that of the filler metal contained in solder guide 1, the two signals or measurements will be integrated in the memory circuits of 27, which will trigger the control of refrigerant flow via motor pump 29, which will adjust this action until there is a thermal balance as determined in advance between thermocouple 6, hence of the filer metal, and the workpiece to be soldered (controlled by 25 and 33).

If this thermal balance between the parts mentioned above tends to exceed the temperature posted at 24, a command signal memorized by 27 will start the operation of the mechanical or oleo-pneumatic apparatus 31 which will actuate thermal screen 5, effectively protecting solder guide 1 from thermal radiations of the burner flame. A thermal balance will be established by an equalizing of the ideal temperature manually posted at 24 and that of 36, and there will be concidence. It is only at this precise moment that the triggering of the advance of the filler metal contained in tubular guide 1 will be commanded by mechanism 14 that is actuated by 13 which detects the presence of filler metal 4 in the propulsion device. It remains to be said that the command for injection of reducer gas from 8' during the time of delivering the melted filler metal on the work piece to be soldered is commanded by 35, and that the same is true for the ignition or extinguishing of the burner or burners 8 during the phase of change of pieces that occurs after each soldering operation, these functions being commanded automatically in the course of the process of actions recorded by programming the electronic memories that are situated at 27 in the diagram.

The advantages of preheating the filler metal which is the subject of the present invention, as well as of the extinguishing of the burners and the interruption of the injection of reducer gases during the time of changing the workpieces are very great. The saving in precious filler metals, in combustible and fuel gases and reducer gases is considerable. Because of the heat developed by oxy-acetylene combustion (about 3,300° C.), the use of alloys with a nickel-chromium-molybdenum, cobalt etc. base instead of silver or gold base alloys is allowed. Moreover it is known that the use of these alloys of common metals allows the attaining of high mechanical characteristics, as well as excellent resistence to abrasion and corrosion. The devices just described ensure these advantages, including use of reducer gases such as nitrogen or nitrogen-hydrogen.

Although the invention has been described in considerable detail with respect to preferred embodiments thereof, it will be apparent that the invention is capable of numerous modifications and variations, apparent to those skilled in the art, without departing from the spirit and scope of the invention.

I claim:

1. A device for feeding filler metal for a welding operation of the type having a burner and a means for feeding gases, comprising:

a guide body for delivering the filler metal, said guide body being exposed to the heat from the burner to preheat the filler metal in the guide body to a temperature just below its melting point, the feed of the filler metal being in response to the temperature of the filler metal in the guide body, and the operation of the burner and the feed of gases being responsive to the feed of filler metal, whereby when the feed of the filler metal stops to change the workpiece, the ignition of the burner and the feed of the gases also stops.

2. A soldering device comprising:

a guide body for receiving and delivering a filler metal, the end portion of the guide body being constructed to be exposed to the heat from a heat supplying burner to preheat the filler metal to a temperature just below its melting point, heat sensing means for sensing the temperature of the filler metal in said end portion, and feed means for delivering the filler metal to the guide body, said feed means being operative to feed the filler metal in response to the temperature sensed by the heat sensing means.

3. A soldering device according to claim 2, said heat sensing means being a thermocouple.

4. A soldering device according to claim 2, said guide body having a coolant portion upstream from said end portion, circulating means for circulating a coolant fluid therethrough to cool the filler metal upstream from said end portion, and the circulating means being operable in response to the heat sensing means.

5. A soldering device according to claim 2 or claim 4, including a heat screen, means for moving the heat screen between the burner and the said end portion of the guide body, to control the heat delivered to the end portion to preheat the filler metal, said means for moving the heat screen being responsive to said heat sensing means.

6. A soldering device according to claim 2, including an electronic memory, means for setting in the electronic memory a preset temperature for melting of the filler metal, and means for comparing the temperature sensed by the heat sensing means with the preset temperature for operating the feed means.

7. A soldering device according to claim 6, said guide body having a coolant portion upstream from said end portion, circulating means for circulating the coolant fluid therethrough to cool the filler metal upstream from said end portion, and the circulating means being operable in response to the heat sensing means and the preset temperature in the electronic memory.

8. A soldering device according to claim 2, including a burner and a means for delivering a reducing gas to the welding area, the burner and the means for delivering the reducing gas both being operably connected to the feed means to be cut off when the feed means is stopped to change the workpiece.

9. A soldering device according to claim 2, including a first detector for determining the burner temperature, a second detector for detecting the workpiece temperature, an integrator for receiving signals from the first and second detectors and comparing them to a signal received from the heat sensing means for operating the feed means.

10. A method for feeding filler metal for a welding operation, comprising the steps of:

delivering the filler metal through a guide body, preheating the filler metal located at the end portion of the guide body to a temperature just below its melting point by exposing the said end portion of the guide body to heat from a heat supplying burner, sensing the temperature of the filler metal at said end portion, and setting the speed of feed of the filler metal in response to the sensed temperature.

11. A method according to claim 10, wherein the step of delivering filler metal includes delivering filler metal having of a precious metal content as a minor ingredient.

12. A method according to claim 10 or claim 11, including cooling the guide body upstream from the location at which it is heated, and regulating the degree of cooling in response to the sensed temperature.

13. A method according to claim 10 or claim 11, including moving a heat screen between the heat supplying burner and the said end portion of the guide body to shield the said end portion from the heat, and regulating movement of the heat screen in response to the sensed temperature.

14. A method according to claim 10 or claim 11, including cooling the guide body upstream from the location at which it is heated, and regulating the degree of cooling in response to the sensed temperature, and including moving a heat screen between the heat supplying burner and the said end portion of the guide body to shield the said end portion from the heat, and regulating movement of the heat screen in response to the sensed temperature.

15. A method according to claim 10 or claim 11, including setting an electronic memory at a preset temperature for melting of the filler metal, and comparing the sensed temperature at the said end portion with the preset temperature for setting the speed of feed of the filler metal.

16. A method according to claim 10 or claim 11, including delivering a reducing gas to the welding area, and cutting off the reducing gas when feeding of filler metal stops.

* * * * *